United States Patent
Ito

(10) Patent No.: US 7,203,523 B2
(45) Date of Patent: Apr. 10, 2007

(54) PORTABLE TELEPHONE WITH MUSICAL TONES PLAYBACK AND CLASS RESPONSE TO INCOMING CALL(S)

(75) Inventor: Shuhei Ito, Toyohashi (JP)

(73) Assignee: Yamaha Corporation, Hamamatsu-shi (JP)

( * ) Notice: Subject to any disclaimer, the term of this patent is extended or adjusted under 35 U.S.C. 154(b) by 168 days.

(21) Appl. No.: 10/168,862

(22) PCT Filed: Dec. 28, 2000

(86) PCT No.: PCT/JP00/09413

§ 371 (c)(1),
(2), (4) Date: Oct. 21, 2002

(87) PCT Pub. No.: WO01/49006

PCT Pub. Date: Jul. 5, 2001

(65) Prior Publication Data

US 2003/0109289 A1    Jun. 12, 2003

(30) Foreign Application Priority Data

Dec. 28, 1999    (JP)    ............................ 11-377325

(51) Int. Cl.
*H04M 1/00*    (2006.01)
(52) U.S. Cl. ............... 455/567; 477/401; 477/177.1
(58) Field of Classification Search .............. 455/567, 455/556.1, 412.1, 412.2, 344, 48, 419, 3.06, 455/414.4, 418, 401, 177.1; 379/373.01, 379/373.02, 373.03, 373.04
See application file for complete search history.

(56) References Cited

U.S. PATENT DOCUMENTS

| | | | |
|---|---|---|---|
| 5,033,076 A | * | 7/1991 | Jones et al. .............. 379/88.2 |
| 5,661,788 A | | 8/1997 | Chin |
| 5,845,219 A | * | 12/1998 | Henriksson ................ 455/567 |
| 5,890,071 A | * | 3/1999 | Shimanuki ................ 455/567 |
| 6,038,443 A | * | 3/2000 | Luneau ....................... 455/415 |

(Continued)

FOREIGN PATENT DOCUMENTS

JP        07-023081        1/1995

(Continued)

OTHER PUBLICATIONS

NOKIA: "User's Guide—Nokia 5110"; Nokia Mobile Phones, 'Online! 1998, pp. 20-21, XP002238595; Retrieved from the Internet: <URL:http://nds1.nokia.com/phones/files/guides/5110_usersguideen.pdf>'retrieved on Apr. 16, 2003! * p. 20-21 *.

(Continued)

*Primary Examiner*—Sonny Trinh
(74) *Attorney, Agent, or Firm*—Pillsbury Winthrop Shaw Pittman LLP

(57) ABSTRACT

A portable telephone is designed to control generation of musical tones and/or incoming call sound in response to classes of telephone numbers by which incoming calls are to be received. That is, the portable telephone stops generating musical tones while generating incoming call sound in response to telephone numbers of the first class; or it gradually decreases musical tones in tone volume in response to telephone numbers of the second class. In response to telephone numbers of the third class, the portable telephone continues generating musical tones without interruption while automatically disconnecting the line without generating incoming call sound.

11 Claims, 1 Drawing Sheet

U.S. PATENT DOCUMENTS

| | | | |
|---|---|---|---|
| 6,094,587 A * | 7/2000 | Armanto et al. | 455/567 |
| 6,308,086 B1 * | 10/2001 | Yoshino | 455/567 |
| 6,366,791 B1 * | 4/2002 | Lin et al. | 455/567 |
| 6,418,330 B1 * | 7/2002 | Lee | 455/567 |
| 6,573,825 B1 * | 6/2003 | Okano | 340/7.51 |
| 6,662,022 B1 * | 12/2003 | Kanamori et al. | 455/556.1 |
| 2002/0107049 A1 * | 8/2002 | Maquaire et al. | 455/563 |
| 2003/0013432 A1 * | 1/2003 | Fukaya | 455/412 |
| 2003/0032415 A1 * | 2/2003 | Cho et al. | 455/415 |

FOREIGN PATENT DOCUMENTS

| | | |
|---|---|---|
| JP | 08-125723 | 5/1996 |
| JP | 09/200303 | 7/1997 |
| JP | 09-238178 | 9/1997 |
| JP | 10-173764 | 6/1998 |
| JP | 10-190789 | 7/1998 |
| JP | 11-252220 | 9/1999 |
| WO | WO9943136 A | 8/1999 |

OTHER PUBLICATIONS

R Maciejewski, Communication pursuant to Article 96(2) EPC, Office Action, European Patent Office(Europe), pp. all, (April 26, 2005).

* cited by examiner

US 7,203,523 B2

PORTABLE TELEPHONE WITH MUSICAL TONES PLAYBACK AND CLASS RESPONSE TO INCOMING CALL(S)

TECHNICAL FIELD

This invention relates to portable telephones that have musical tone playback functions in addition to portable telephone functions.

BACKGROUND ART

Recently, electronic distribution systems have been widely recognized by general users or subscribers of portable telephones, so that melody sounds are downloaded and distributed to portable telephones as incoming call sounds over communication networks. In the future, it is expected that plenty of portable telephones provide musical tone playback circuits to play back musical tones of prescribed musical tunes that have rich expressions in music compared with simple incoming call sounds. For example, it is possible to develop portable telephones incorporating MP3 (namely, MPEG Audio Layer 3) decoders, to which MP3 data are distributed as audio contents. Thus, portable telephones incorporating MP3 decoders can be used as new music playback devices that substitute for the existing portable cassette tape players, for example.

It is naturally expected that users of portable telephones, which can be used as music playback devices, tend to regard musical tone playback functions important rather than original portable telephone functions. In addition, it is considered that users, particularly young users, may incline to listen to the music played back rather than human speech over phone communication. Such tendency will be increased in the future because all users do not always feel happy to receive phone calls at all times, in other words, some users may refuse to receive phone calls from unwelcome or undesirable persons with whom they do not want to communicate over the phones.

This invention is made in consideration of the aforementioned circumstances, so it is an object of the present invention to provide a portable telephone that is capable of controlling tone volume of played back musical tones and turning on or off playback of musical tones in response to the property of a calling party, which may be represented by calling party communication data automatically transmitted to a called party, such as the significance, priority, and personality of the calling party.

DISCLOSURE OF INVENTION

This invention is applicable to portable telephones having both of portable telephone functions and musical tone playback functions. Herein, this invention provides a portable telephone that controls generation of musical tones and/or incoming call sound in response to classes of telephone numbers by which incoming calls are to be received. That is, prescribed telephone numbers are stored in advance in connection with classes, which are determined in consideration of the significance, priority, and personality of calling parties. In response to the telephone number of the first class, the portable telephone stops generating musical tones but generates incoming call sound to notify a user of reception of an incoming call from an important person such as a chief in his/her company. In response to the telephone number of the second class, the portable telephone gradually decreases musical tones in tone volume while generating incoming call sound to notify the user of reception of an incoming call from a preferable person such as a friend. In response to the telephone number of the third class, the portable telephone continues generating musical tones without generating incoming call sound, wherein it also sends a prescribed voice message to a calling party such as an unwelcome person with whom the user does not want to communicate over the phone, then, it automatically disconnects a line connected with the calling party.

Thus, it is possible to provide flexible manners for controlling generation of musical tones and/or incoming call sound in consideration of the classes of the telephone numbers that are listed in advance.

BEST MODE FOR CARRYING OUT THE INVENTION

Figure 1:
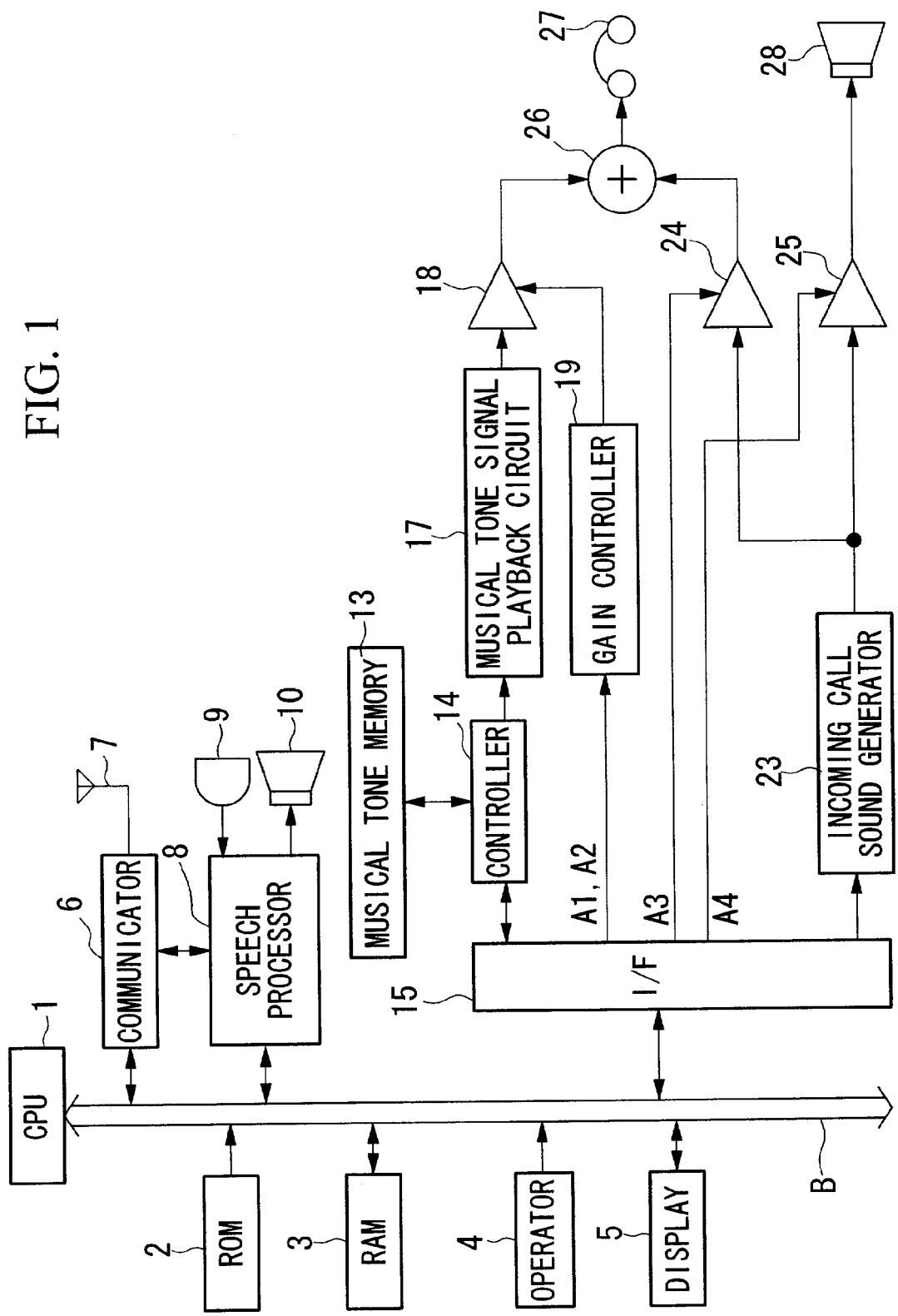
FIG. 1 is a block diagram showing an electronic configuration of a portable telephone in accordance with a preferred embodiment of the invention.

This invention will be described in further detail by way of examples with reference to the accompanying drawing.

FIG. 1 shows an electronic configuration of a portable telephone in accordance with a preferred embodiment of the invention. Herein, reference numeral 1 designates a central processing unit (CPU); 2 designates a read-only memory (ROM) that stores programs run by the CPU; and 3 designates a random-access memory (RAM) that stores various types of data and has battery backup. In addition, reference numeral 4 designates an operator section that provides keypads of a ten-key unit for allowing entry of telephone numbers and function keys; and 5 designates a display that is constituted by a liquid crystal display.

Further, reference numeral 6 designates a communicator coupled with an antenna 7. The communicator 6 transmits signals and data by modulation using carrier waves via the antenna 7, and it receives via the antenna 7 incoming signals and data, which are demodulated and are forwarded to the CPU 1 or a speech processor 8. The speech processor 8 converts speech signals output from a microphone 9 to digital data, which are compressed and are then forwarded to the communicator 6 as transmission data. In addition, the speech processor 8 converts speech data output from the communicator 6 to analog speech signals, which are forwarded to a speaker 10.

Reference numeral 13 designates a musical tone memory that stores digital musical tone data. It is possible to share functions of the musical tone memory 13 with the RAM 3. A read/write controller 14 performs read/write controls on the musical tone memory 13. That is, under the control of the controller 14, musical tone data are written to the musical tone memory 13 by way of a bus line B and an interface circuit (I/F) 15; or musical tone data are read from the musical tone memory 13 and are forwarded to a musical tone signal playback circuit 17. The musical tone signal playback circuit 17 receives the musical tone data by way of the controller 14 to convert them to analog musical tone signals, which are forwarded to an amplifier 18.

The amplifier 18 amplifies the musical tone signals output from the musical tone signal playback circuit 17. That is, the amplifier 18 is constituted as a gain-controlled amplifier whose control terminal receives the output of a gain controller 19. The gain controller 19 receives signals A1, A2 from the CPU 1 by way of the bus line B and interface circuit 15 so as to produce a control signal for controlling the gain of the amplifier 18. Thus, the control terminal of the amplifier 18 receives the control signal output from the gain controller 19 based on the signals A1, A2 given from the CPU 1. Herein, the gain controller 19 controls the amplifier 18 such that its gain is set to '0' if both the signals A1, A2 are '0'; or the gain controller 19 controls the amplifier 18 such that its gain is set to '1' if both the signals A1, A2 are '1'. When the signals A1, A2 are respectively set at '1' and '0', the gain controller 19 controls the amplifier 18 such that its gain gradually decreases from '1' to '0'.

An incoming call sound generator 23 generates incoming call sound signals, representing sounds that inform the user or subscriber of reception of incoming calls, in accordance with instructions given from the CPU 1. The incoming call sound signals are supplied to amplifiers 24 and 25 respectively. The amplifiers 24 and 25 are constituted as gain-controlled amplifiers whose control terminals respectively receive signals A3 and A4 from the CPU 1. The output of the amplifier 24 whose gain is controlled in response to the signal A3 is forwarded to a mixer 26, while the output of the amplifier 25 whose gain is controlled in response to the signal A4 is forwarded to a speaker 28. The mixer 26 mixes together outputs of the amplifiers 18 and 24 to produce mixed signals, which are forwarded to headphones 27.

Next, operations and functions of the portable telephone will be described in accordance with the present embodiment. The portable telephone of the present embodiment is designed to have functions of a music player as well as functions of a portable telephone terminal.

First, a description will be given with respect to portable telephone functions of the portable telephone of the present embodiment. In this case, the CPU 1 outputs signals A1, A2, A3, and A4 that are respectively set to '0', '0', '0', and '1'. Thus, only the amplifier 25 acts as an amplifier whose gain is '1', while the other amplifiers 18 and 24 are shut off because of gain '0'.

At reception of an incoming call, the communicator 6 receives incoming call signals via the antenna 7, so that the incoming call signals are demodulated to produce incoming call data, which are forwarded to the CPU 1. Upon receipt of the incoming call data, the CPU 1 stores into the RAM 3 a telephone number of a calling party while it also issues an incoming call sound generation instruction to the incoming call sound generator 23. Upon receipt of the incoming call sound generation instruction, the incoming call sound generator 23 generates incoming call sound signals, which are forwarded to the amplifier 25. The amplifier 25 amplifies the incoming call sound signals to be forwarded to the speaker 28. Thus, the speaker 28 produces incoming call sound.

The portable telephone rings the incoming call sound to notify a user or subscriber (namely, called party) of reception of an incoming call from the calling party. Then, the user presses a call reception button (not shown) on the operator section 4 to answer the phone. At this time, the CPU 1 detects depression of the call reception button to issue an incoming call sound stop instruction to the incoming call sound generator 23 while it also issues a call connection instruction to the speech processor 8 and communicator 6. Thus, a call line is established and connected with the calling party, so that the called party of the portable telephone is able to speak with the calling party. Herein, the microphone 9 converts the user's speech to speech signals, which are transmitted to the calling party by means of the communicator 6 and antenna 7 over the connected line. In addition, the speech of the calling party is transmitted to the portable telephone so that the speech processor 8 converts the corresponding speech data to speech signals, which are forwarded to the speaker 10. Thus, the user is able to listen to the speech of the calling party by the speaker 10.

Next, a description will be given with respect to music playback functions of the portable telephone that acts as a music player. In this case, the user operates the portable telephone to make a call to a music download center that is located in the prescribed facility. Herein, the user operates the portable telephone to designate a desired musical tune and requests the music download center to download it thereto. The music download center distributes all musical tunes in the prescribed format of digital musical tone data. The portable telephone receives from the music download center the digital musical tone data of the desired musical tune that is distributed from the music download center. Thus, the CPU 1 stores into the RAM 3 the digital musical tone data distributed to the portable telephone. Incidentally, the RAM 3 is capable of storing digital musical tone data of multiple musical tunes therein. After completion of distribution, the user operates prescribed keys of the operator section 4 to designate one of the musical tunes stored in the RAM 3 and instructs playback of the designated musical tune.

The user's instruction for the playback of the musical tune is acknowledged by the CPU 1 to output signals A1, A2, A3, and A4 that are set to '1', '1', '1', and '0' respectively. In response to these signals A1 to A4, the amplifiers 18 and 24 act as amplifiers whose gain is '1', while the amplifier 25 is shut off. Next, the CPU 1 reads from the RAM 3 the digital musical tone data of the designated musical tune, which are forwarded to the controller 14. The controller 14 writes the digital musical tone data given from the CPU 1 to the musical tone memory 13. Then, the CPU 1 issues a music playback instruction to the controller 14. Upon receipt of the music playback instruction, the controller 14 reads from the musical tone memory 13 the digital musical tone data, which are sequentially forwarded to the musical tone signal playback circuit 17. The musical tone signal playback circuit 17 forms analog musical tone signals based on the digital musical tone data output from the controller 14. The musical tone signals are forwarded to the headphones 27 by way of the amplifier 18 and mixer 26. Thus, the headphones 27 produce musical tones corresponding to the musical tone signals.

Next, a description will be given with respect to reception of an incoming call from a calling party during playback of musical tones.

To cope with incoming calls during playback of musical tones, the user of the portable telephone stores in advance prescribed telephone numbers in the RAM, wherein the telephone numbers are listed in consideration of specific persons from whom the user have possibilities of receiving calls. Herein, the telephone numbers are divided into groups (or classes), namely, A, B, and C as follows:

A: important persons such as teachers, seniors and chiefs in one's company.

B: family members, relatives, friends and colleagues in one's company.

C: unwelcome persons with whom the user does not want to communicate over the phone.

When the portable telephone receives an incoming call, the CPU 1 stores the telephone number of a calling person in the RAM 3. Next, the CPU 1 compares the telephone number of the calling person with the prescribed telephone numbers that are stored in the RAM 3 in connection with the aforementioned groups A, B and C respectively. That is, the CPU 1 checks the telephone number of the calling person with the prescribed telephone numbers stored in the RAM 3 in advance. If the telephone number matches the prescribed telephone number belonging to the group A, the CPU 1 outputs signals A1, A2, A3, and A4 that are set to '0', '0', '1', and '1' respectively; then, it outputs an incoming call sound generation instruction. When the CPU 1 outputs the signals A1-A4 corresponding to '0,0,1,1', the amplifier 18 is shut off to terminate generation of musical tones by the headphones 27, while the amplifiers 24 and 25 act as amplifiers whose gain is '1'. In addition, the CPU 1 outputs the incoming call sound generation instruction to the incoming call sound generator 23, which in turn generates incoming call sound signals. The incoming call sound signals are delivered to the headphones 27 and speaker 28 by way of the amplifiers 24 and 25 respectively.

As described above, when the portable telephone receives an incoming call from the person whose telephone number is listed in the group A during playback of musical tones, the portable telephone immediately stops producing musical tones by the headphones 27, but it generates incoming call sound by both the headphones 27 and speaker 28.

If the portable telephone receives an incoming call from a person whose telephone number is listed in the group B during playback of musical tones, the CPU 1 outputs signals A1, A2, A3, and A4 that are set to '1', '0', '1', and '0' respectively; then, it outputs an incoming call sound generation instruction. When the CPU 1 outputs the signals A1–A4 corresponding to '1,0,1,0', the amplifier 18 is gradually decreased in gain from '1' to '0' so that the musical tones generated by the headphones 27 are gradually decreased in tone volume, while the amplifier 24 acts as an amplifier whose gain is '1' but the amplifier 25 is shut off. Upon receipt of the incoming call sound generation instruction, the incoming call sound generator 23 generates incoming call sound signals, which are delivered to the headphones 27 by way of the amplifier 24.

As described above, when the portable telephone receives an incoming call from the person whose telephone number is listed in the group B during playback of the musical tones, the portable telephone gradually decreases musical tones in tone volume, while it also generates incoming call sound by the headphones 27. This reduces unpleasant feeling of the user that may be caused by interruption due to the incoming call during playback of the musical tones.

If the portable telephone receives an incoming call from a person whose telephone number is listed in the group C, the CPU 1 accesses to the ROM 2 to read and reproduce prerecorded voice message data, which correspond to a voice message as follows:

"Now, the user is unable to answer the phone."

That is, the CPU 1 reads from the ROM 2 the aforementioned voice message data, which are forwarded to the speech processor 8. Then, the voice message data are transmitted to the calling person by the communicator 6 and antenna 7. Thereafter, the portable telephone disconnects a line connected with a telephone terminal of the calling person. In this case, the portable telephone automatically sends the prescribed voice message to the calling person without terminating playback of musical tones. In addition, the portable telephone does not generate incoming call sound that may obstruct the user from listening to musical tones played back. Further, the portable telephone automatically disconnects the line connected with the 'unwelcome' calling person whose telephone number is listed in the group C.

If the portable telephone receives an incoming call from a person whose telephone number is not listed in any of the groups A, B, and C, the CPU 1 outputs signals A1, A2, A3, and A4 that are set to '1', '1', '1', and '1' respectively; then, it outputs an incoming call sound generation instruction. When the CPU 1 outputs the signals A1–A4 corresponding to '1,1,1,1', all the amplifiers 18, 24 and 25 continuously act as amplifiers whose gain is '1'. Therefore, the headphones 27 continuously generate musical tones based on musical tone signals supplied thereto by way of the amplifier 18. In addition, the incoming call sound generator 23 generates incoming call sound signals, which are delivered to the headphones 27 and speaker 28 by way of the amplifiers 24 and 25 respectively. Thus, both the headphones 27 and speaker 28 produce incoming call sound to notify the user of reception of an incoming call from an unknown person whose telephone number is not listed in any of the groups A, B, and C.

That is, when the portable telephone receives an incoming call from the unknown person whose telephone number is not listed in advance, the portable telephone simultaneously proceeds to playback of musical tones and generation of incoming call sound by the headphones 27.

Lastly, this invention has a variety of effects and technical features, which are described below:

(1) This invention provides a portable telephone having a musical tone playback function, wherein at reception of an incoming call, a telephone number of a calling person is checked against prescribed telephone numbers of calling parties that are listed in advance in a storage, so that playback of musical tones is controlled in response to the check result. Herein, it is possible to control musical tones in tone volume, and turn on or off playback of musical tones in consideration of the significance of calling parties whose telephone numbers are designated by calling party communication data.

(2) Playback of musical tones is controlled in response to classes (or groups) of telephone numbers of calling parties. For example, musical tones are decreased in tone volume or stopped in response to classes of calling parties who actually call the user of the portable telephone. That is, the user is able to acknowledge the class of the calling party by sensing changes of musical tones played back by the portable telephone. In other words, it is possible to acknowledge the significance of the calling party who actually calls the user of the portable telephone.

(3) The portable telephone incorporates a controller that decreases musical tones in tone volume at reception of an incoming call from a classified calling party. Thus, it is possible to reduce unpleasant feeling of the user due to interruption during playback of musical tones.

(4) The portable telephone has a capability of automatically disconnecting the line connected with the telephone terminal of an unwelcome person with whom the user does not want to communicate over the phone. Thus, it is possible to reduce user's troubles in handling communication with the unwelcome person. As described heretofore, this invention is not necessarily limited to the foregoing embodiment, hence, it is possible to provide a variety of modifications without departing from the essential subject matter of this invention.

The invention claimed is:

1. A portable telephone having an incoming call sound generator for generating incoming call sound, a line connection establisher for establishing a line connection with a telephone terminal, a communicator for performing communication by the established line connection, and a musical tone generator for generating musical tones of a prescribed musical tune, said portable telephone comprising:

a storage for storing in advance prescribed telephone numbers in association with a plurality of classes respectively;

a telephone number checker for upon receipt of an incoming call from a calling party, checking a telephone number of the calling party with the prescribed telephone numbers stored in the storage to determine one of the classes to which the telephone number of the calling party belongs; and a musical tone controller for, upon receipt of the incoming call during generation of the musical tones of the musical tune by the musical tone generator, controlling the musical tone generator in a selected manner, in response to the class determined by the telephone number checker, out of a plurality of predetermined manners respectively associated with the classes.

2. The portable telephone according to claim 1, wherein the musical tone controller controls the musical tone generator to gradually decrease musical tones in tone volume when the telephone number checker determines that the telephone number belongs to a prescribed one of the classes.

3. A portable telephone having an incoming call sound generator for generating incoming call sound, a line connection establisher for establishing a line connection with a telephone terminal, a communicator for performing communication by the established line connection, and a musical tone generator for generating musical tones of a prescribed musical tune, said portable telephone comprising:

a storage for storing in advance prescribed telephone numbers;

a telephone number checker for upon receipt of an incoming call from a calling party, checking a telephone number of the calling party with the prescribed telephone numbers stored in the storage; and a line disconnecting section for inhibiting the incoming call sound generator from generating the incoming call sound while disconnecting a line connected with a telephone terminal of the calling party in response to a check result of the telephone number checker.

4. A portable telephone comprising:

a storage for storing in advance a plurality of prescribed telephone numbers in association with a plurality of classes respectively;

an incoming call sound generator for generating incoming call sound upon receipt of an incoming call from a telephone terminal of a calling party;

a musical tone generator for generating musical tones of a prescribed musical tune;

a telephone number checker for checking a telephone number of the calling party with the prescribed telephone numbers stored in the storage and for determining one of the classes to which the telephone number of the calling party belongs; and a controller for controlling the incoming call sound generator and the musical tone generator in accordance with an incoming call sound control pattern and a musical tone control pattern which are predetermined in association with each of the classes, the controller controlling the incoming call sound generator and the musical tone generator in accordance with the incoming call sound control pattern and the musical tone control pattern prescribed by the class determined by the telephone number checker when the incoming call is received during generation of the musical tones of the prescribed musical tune.

5. The portable telephone according to claim 4, wherein when the telephone number of the calling party is determined to belong to a prescribed first one of the classes by the telephone number checker, the controller controls in accordance with the musical tone control pattern and the incoming call control to cause the musical tone generator to stop generating the musical tones and to cause the incoming call sound generator to activate to generate the incoming call sound.

6. The portable telephone according to claim 4, wherein when the telephone number of the calling party is determined to a prescribed second one of the classes by the telephone number checker, the controller controls, in accordance with the musical tone control pattern and the incoming call control pattern, to cause the musical tone generator to gradually decrease the musical tones in tone volume and to cause the incoming call sound generator to generate the incoming call sound.

7. A portable telephone comprising:

a storage for storing in advance a plurality of prescribed telephone numbers in association with a plurality of classes respectively;

an incoming call sound generator for generating incoming call sound upon receipt of an incoming call from a telephone terminal of a calling party;

a musical tone generator for generating musical tones of a prescribed musical tune;

a telephone number checker for checking a telephone number of the calling party with the prescribed telephone numbers stored in the storage; and a controller for controlling the incoming call sound generator or the musical tone generator or both in response to a check result of the telephone number checker, wherein when the telephone number of the calling party matches a prescribed telephone number belonging to a defined class within the plurality of classes, the controller controls the musical tone generator to continue generating the musical tones while inhibiting the incoming call sound generator from generating the incoming call sound.

8. The portable telephone according to claim 7 further including:

a voice messenger for automatically sending a prescribed voice message to the calling party whose telephone number belongs to the defined class; and a line disconnecting section for after sending the voice message, automatically disconnecting a line used for communication with the calling party.

9. A portable telephone comprising:

a storage for storing in advance a plurality of prescribed telephone numbers in association with a plurality of classes respectively;

an incoming call sound generator for generating incoming call sound upon receipt of an incoming call from a telephone terminal of a calling party;

a musical tone generator for generating musical tones of a prescribed musical tune;

a telephone number checker for checking a telephone number of the calling party with the prescribed telephone numbers stored in the storage; and a controller for controlling the incoming call sound generator or the musical tone generator or both in response to a check result of the telephone number checker, wherein when the telephone number of the calling party matches a prescribed telephone number belonging to a first class within the plurality of classes, the controller stops the musical tone generator generating the musical tones while activating the incoming call sound generator to generate the incoming call sound and when the telephone number of the calling party matches a prescribed telephone number belonging to a second class within the plurality of classes, the controller controls the musical tone generator to gradually decrease the musical tones in tone volume while activating the incoming call sound generator to generate the incoming call sound.

10. A portable telephone having an incoming call sound generator for generating incoming call sound, a line connection establisher for establishing a line connection with a telephone terminal, a communicator for performing communication by the established line connection, and a musical tone generator for generating music tones of a prescribed musical tune, said portable telephone comprising:
   a storage for storing in advance prescribed telephone numbers;
   a telephone number checker for upon receipt of an incoming call from a calling party, checking telephone number of the calling party with the prescribed telephone numbers in storage; and
   a musical tone controller for controlling tone volume of the musical tone generator in response to a check result of the telephone number checker.

11. A portable telephone comprising:
   a storage for storing in advance a plurality of prescribed telephone numbers in connection with a plurality of classes, respectively;
   an incoming call sound generator for generating incoming call sound upon receipt of an incoming call from a telephone terminal of a calling party;
   a musical tone generator for generating musical tones of a prescribed musical tune;
   a telephone number checker for checking a telephone number of the calling party with the prescribed telephone numbers stored in the storage; and
   a controller for controlling the incoming call sound generator and tone volume of the musical tone generator in response to a check result of the telephone number checker.

* * * * *